United States Patent [19]

Richards

[11] Patent Number: 5,414,806
[45] Date of Patent: May 9, 1995

[54] PALETTE AND PARTS VIEW OF A COMPOSITE OBJECT IN AN OBJECT ORIENTED COMPUTER SYSTEM

[75] Inventor: Justin J. C. Richards, Hatton, England

[73] Assignee: International Business Machines Corporation, Armonk, N.Y.

[21] Appl. No.: 105,837

[22] Filed: Aug. 12, 1993

[30] Foreign Application Priority Data

Aug. 29, 1992 [GB] United Kingdom ............... 9218458

[51] Int. Cl.[6] ............................................. G06F 15/62
[52] U.S. Cl. .................................... 395/135; 395/133; 395/139; 395/155; 395/159
[58] Field of Search ............................... 395/133–139, 395/141, 150, 151, 155–161

[56] References Cited

U.S. PATENT DOCUMENTS 5,181,162  1/1993  Smith et al. ................... 364/419.19
5,247,651  9/1993  Clarisse ............................ 395/500

Primary Examiner—Almis Jankus
Attorney, Agent, or Firm—Jeffrey S. LaBaw; Wayne P. Bailey

[57] ABSTRACT

An object-based computer system has a graphical user interface. A palette view is provided onto an object within the system that depicts all the subobjects that potentially form parts of that object. By manipulating the objects in this view, for example by dragging and dropping them onto another view of the object, the user can select them for inclusion in the object. Also provided is a parts view, which depicts the list of parts that have actually been included within the object.

5 Claims, 1 Drawing Sheet

PALETTE AND PARTS VIEW OF A COMPOSITE OBJECT IN AN OBJECT ORIENTED COMPUTER SYSTEM

TECHNICAL FIELD

The present invention relates to an object oriented computer system including a graphical-user interface.

BACKGROUND OF THE INVENTION

One of the most important technical advances in modern computer technology has been the development of object-oriented technology, a form of software engineering based on objects (see e.g. "Object-Oriented Technology: A Manager's Guide", D. Taylor, 1990, Addison Wesley). An object can be defined as a "software package that contains a mixture of procedures and data". An important property of objects is that they are hierarchical. Thus, for example, an object representing a graph might contain sub-objects representing the axes, data, title and so on. An object-oriented system defines object classes, which are templates, with instances of that object class effectively being completed copies of the template. Thus, for example, an object class might represent a form of bar chart, whilst an instance of this class would be an actual bar chart with real data associated with it. Both object classes and instances can be regarded as objects.

Object-oriented systems were first developed in relation to simulation problems, but have now spread into all computing fields, from real-time control systems through computer operating systems to applications software. Object-oriented environments are widely seen as offering a wide range of potential benefits, including enhanced reliability and software re-use.

Another major advance in improving the effectiveness of computer systems has been the adoption of graphical user interfaces (GUI), whereby the user interacts with the computer using a mouse-positioned cursor. Thus, for example, the user can select a particular file within a given directory by first clicking on the icon representing that directory to reveal a series of icons each representing a file within the directory. The desired file can then be selected by clicking on the appropriate icon. GUIs are now provided by many standard operating systems for controlling the computer—for example, for starting programs clicking on an icon, for printing documents and so on. They are further used by applications (usually via the operating system) to allow easier control of the application. Details about a typical GUI can be found in the IBM Common User Access (CUA1) publications: CUA Guide to User Interface Design (SC-34-4289), and CUA Advanced Interface Design Reference (SC-34-4290).

Although object systems have been developed with some form of graphical user interface, such systems are usually controlled via a menu or command-line interface. Often such an interface does not properly reflect the nature of the data or system. For example, the same menu might be presented in a variety of situations, even when some of the listed choices are inapplicable: a graph might still have options relating to say the Y-axis, even though the user has decided to depict the data as a pie chart. Typically extraneous options such as these are greyed out, but nevertheless they can prove distracting and misleading for the user.

SUMMARY OF THE INVENTION

The present invention is concerned with the integration of object-oriented technology with GUIs to provide the most natural and effective control of a computer in an object-oriented environment.

Accordingly, the invention provides an object-oriented computer system wherein the computer system is controlled by a hierarchy of objects in which a composite object incorporates a plurality of mutually interacting subobjects (parts), the subobjects themselves being composite objects except at the bottom of the hierarchy, said computer system supporting a graphical user interface, and characterized in that the object hierarchy includes user computer control means within each composite object, comprising:

means for maintaining a list of the set of parts which the composite object is capable of incorporating;
means for displaying said list as a set of icons each corresponding to a respective part therein; and
means responsive to user selection of one of said set of icons for incorporating the part corresponding to the selected icon within the composite object.

In an object-oriented system, objects are arranged in a hierarchy, whereby each (composite) object is formed from objects lower down the hierarchy (subobjects). It should be appreciated that the terms "composite object" and "subobject" are only used to denote the relative position in the hierarchy of two objects. Except at the top and bottom of the hierarchy, an object will be both a subobject (with respect to an object higher in the hierarchy), and also a composite object (with respect to an object lower in the hierarchy). In systems having a graphical user interface, objects are represented by icons, typically small pictures, although any form of visual symbol or text label could be used for the purposes of the present invention. The computer is controlled by manipulating objects. For example, clicking a mouse cursor on an icon for a graph object may result in the computer calculating and displaying the graph. When an object is invoked in this manner, any parts incorporated within it using the method of the invention, are automatically activated (e.g., a title part has been incorporated into a graph object, then when next produced the graph will be displayed with a title). Thus, the manipulation of parts can be regarded as setting up a control file which will control the operation of the computer when the object is executed.

The advantage of displaying and interacting directly with the list of parts is that the underlying object structure is surfaced right up to the user interface, since the object hierarchy reflects the true architecture of the system. The invention effectively provides another form of view onto an object—which can be termed the palette view—that is dictated not by an interface designer, but by the actual properties of the object in question. The palette view reveals to the user all the potential subobjects of a composite object. Thus, the user experiences the system in terms of its true construction, rather than via some arbitrary structure of menus or other form of interface. This much more direct approach gives the user a clearer understanding of the properties and function of the object in question. Furthermore, the control system is much more flexible, since it is not constrained by the original intent of the designer. Thus the user can utilize any manipulation that the object structure is capable of performing, rather than being limited to those options present in a menu structure (i.e. those considered useful when the system was created). Thus, in terms of the control of the computer, the full technical potential of the system can be exploited. Standard techniques can be used to incorporate a selected subobject into an object. It should be noted that this process is directly controlled by the user manipulating the icon for the subobject, rather than being the previously decided (effectively hardwired) outcome of a menu choice. Moreover the invention obviates the need to design and subsequently update menu structures—the only maintenance required is to ensure that the list of possible parts is kept up to date, with no necessity to generate menu structures, since the parts list is automatically determined by the objects themselves. The adoption of a completely object-based interface also maximizes the potential for software re-use, improving both reliability and coding efficiency.

It is preferred that the user selects a part to be incorporated in the composite object by clicking a mouse on the corresponding icon and dragging and dropping the icon onto a view of the composite object. Using standard GUI techniques for icon manipulation allows the user to interact with the computer in a single, consistent manner. The user will quickly learn how to perform such tasks as navigating the object hierarchy, selecting or deselecting subobjects, and so on, since these techniques will be common to all systems.

In a preferred embodiment, each of the parts in the list represents an object class. These are effectively all the object classes for which appropriate code and data is already present in the system waiting to be activated, or which the object knows how to process if received from another object.

An alternative possibility would be that at least one object class is represented by an instance of that object class. Thus for example, in an application a template object for a graph having certain pre-defined aspects (e.g., a known title and axis size) could have the object classes representing title and the X-axis replaced by object instances in which the title and X-axis are defined. This idea can be extended to include the situation in which at least one object class is represented by more than one instance of that object class. For example, an Annotation object for a graph may be represented by several possible actual annotations which the user may want to add to a graph. Likewise, the input data may be represented by several input data files, if all of these are to be displayed on the same graph. The disadvantage of this approach is that it requires the object to know about subobjects that may not even be parts of the object.

In a preferred embodiment, the invention also includes means for displaying a list of the parts currently incorporated in the composite object. This is a separate view of the object, different from the palette in that it only shows subobjects that are actually rather than potentially present. In general, these parts will have been set by the user (e.g., a title for the Title object will have been specified), although this will not necessarily be true, in which case the system can use default values. While in theory it might be possible to provide a parts view and a palette view simultaneously, e.g., by indicating on the palette those subobjects currently present in the object, it is preferable to keep them separate, because the palette view most naturally displays object classes, whilst the parts view displays actual instances of those classes. Note that the subobjects in the parts view mutually interact to produce the object to which they are attached—e.g., a Title, X-axis, and so on, in combination form a graph, corresponding to the top object. This is in contrast to situations in which the top object represents a container, and it is possible to see the items that are contained within it.

The invention also provides a method of controlling an object-oriented computer system with a hierarchy of objects in which a composite object incorporates a plurality of mutually interacting subobjects (parts), the subobjects themselves being composite objects except at the bottom of the hierarchy, said computer system supporting a graphical user interface, the method being characterized by:
  maintaining within a composite object a list of the set of parts which the composite object is capable of incorporating;
  displaying said list as a set of icons each corresponding to a respective part therein; and
  incorporating a part within the composite object in response to user selection of the icon corresponding thereto.

In a preferred embodiment, a composite object can be altered by changing the set of parts which the composite object is capable of incorporating; and updating the list of the set of parts accordingly. This facility allows new functions to be added to the object template, representing new subobjects that can be incorporated within the object. These new subobjects must be added to the palette so that they are available for user selection, An embodiment of the invention will now be described by way of example with reference to the following drawings:

DETAILED DESCRIPTION OF THE PREFERRED EMBODIMENT

In an object-oriented environment, objects are formed in a hierarchical structure. Thus an object may consist of other objects (subobjects for that object), which in turn have their own subobjects, until the bottom of the hierarchy is obtained. These subobjects can be referred to as "parts". A part is an object incorporated into the system or application that can be manipulated by the user so as to modify the system's behavior. In other words, the system can be operated by direct manipulation of its parts, rather than through the more traditional concepts of a command or menu-driven interface. Thus adding, modifying or deleting a part adds, modifies or deletes the aspect of the system's behavior associated with that part. A part is not simply an item contained within an object (in the way that a file is contained within a directory) but has a much closer relation to the system, representing some intrinsic feature of the system. As an analogy, consider the difference between a car (representing a top object) (i) having a rear view mirror (representing a subobject) correctly attached to its windscreen, or (ii) simply having a rear view mirror lying in the boot. Only in the former case could the rear view mirror be validly described as a "part" or subobject of the car.

There are several possible "views" of an object, or ways in which a user can interact with it. These include the "icon view", which is simply an icon representing the object. The user can manipulate the object by operations on the icon, such as dragging it and dropping it to move the object to another directory. An object can also have a "composed view", in which the constituent parts fully interact. Thus, the composed view of a graph would be an actual picture of the graph. Not all objects (and in particular those lower down the hierarchy) have a composed view. For example, a printer object, onto which objects for printing could be dropped, would not have such a composed view. On the other hand, the printer would have a "settings view"—a list of parameters that the user can control, such as the number of copies to be printed.

Figure 1:
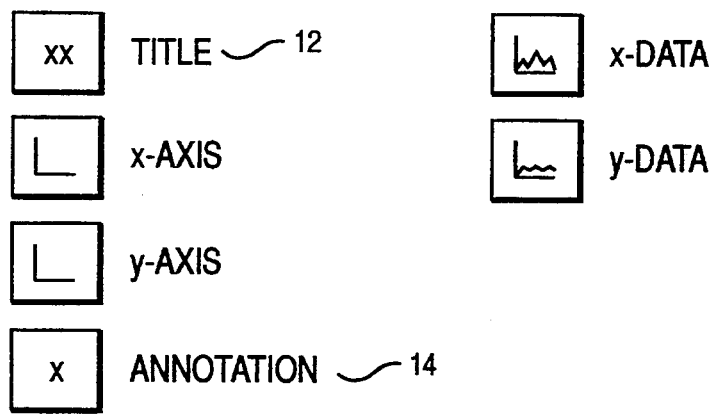
FIG. 1 illustrates a palette showing the objects that potentially form parts of a graph.

In accordance with the invention, two further views are provided which are directly related to the parts construction of an object. FIG. 1 shows the first of these, known as the "palette view", which is a view of an object that lists the possible parts that can be included in the object. In FIG. 1, a graph object 10 has subobjects representing, for example a Title 12, Annotation 14, a Legend, etc. This is the full range of subobjects that the graph is capable of incorporating and so acts in effect as a form of template. In order to add say a Title to the graph, the user would select the Title icon from the palette and drag and drop it onto any other view of the graph. Techniques for achieving this icon manipulation are already well-known, for example in selecting input files for a program, and so will not be described in detail. It is also known how to make this context-sensitive, so that for example an annotation will be positioned wherever it is dropped onto the composed view of the graph.

The invention also defines a "parts view", which is the list of subobjects or parts actually (rather than potentially) present within an object. The parts view therefore depicts a (possibly null) subset of the palette. As mentioned above, the parts included in an object interact with one another to produce the overall action of the object itself. The parts view will probably have some similarity to the settings view. For example, a settings view might have a "Yes/No" choice on whether to include a y-axis in a graph, which would correspond to the presence or otherwise of a y-axis subobject in the parts view. Note that the palette view can contain parts that are not represented in the settings view, while the settings view can contain choices that do not correspond to parts of the object (and so are not in the palette). The former case depends on the choice of the designer—for example, there may be no setting to request an annotation for a graph, yet this may be available from the palette. Alternatively, choice of color may be regarded more properly as a setting, rather than an object part. Since the settings view and the parts view both relate to the same object, they cannot be in conflict—for example adding a y-axis to the parts view will automatically be reflected in the settings view.

Objects in the palette generally will contain subobjects themselves, each of which will have their own palette view listing all their respective possible subobjects. These can be manipulated in exactly the same way down to the bottom of the hierarchy.

Figure 2:
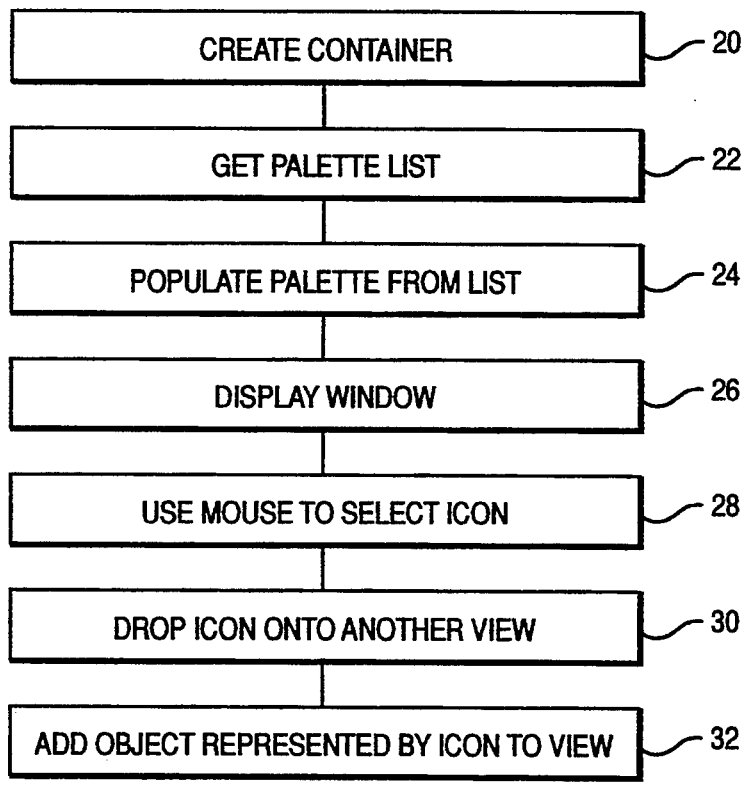
FIG. 2 illustrates the method whereby the palette may be used to control the behavior of the associated object.

FIG. 2 illustrates the method whereby an object in an application can display a list of its potential parts or subobjects in an OS/2 operating system environment (although the invention is also applicable to other operating systems having a GUI). The first step 20 is to create a container (an OS/2 construct), which is then populated with the details of the contents of the palette, along with their respective icons, at 22 and 24. The window corresponding to the container can then be displayed at 26, containing the palette. Again, using standard OS/2 constructs, the user can select one of the icons from the palette with the mouse at 28, and drag and drop the icon onto any view of the object at 30, with the result that this subobject is appended to the object at 32. The parts view is obtained in essentially the same way.

In terms of the actual objects themselves, templates for the different sorts of objects already exist in OS/2. These are effectively object classes, for example, representing a particular form of graph. In order to produce an actual instance of this graph, the user would copy the object template (both object classes and instances can be treated as objects), adding details of his or her own data. In accordance with the invention, these templates include the ability to perform the functions of FIG. 2. Also, each template has an associated list used as the basis for the palette. When a user makes a copy of the template, the ability to perform the functions of FIG. 2 is automatically copied over to the new object. The new object can either make its own copy of the palette list, or can simply include a reference to the palette list of the template. Care needs to be taken however that if the template and its palette are updated, any objects derived from earlier versions of the template only have their palettes updated if appropriate.

The palette therefore effectively represents a series of hooks corresponding to each potential subobject onto which they can be attached. In many cases, it may be possible to attach more than one object instance onto the relevant hook. Thus, for example, a graph would have Annotation as a subobject, and could accept a large (possibly unlimited) number of actual annotations.

As regards the parts view, this reflects those potential objects which are actually selected from those available in the palette. The parts view can therefore be generated either by inspecting the subobjects that have been attached to the object, or by maintaining a separate list analogous to that maintained for the palette.

The subobjects displayed in the palette normally represent object classes. Thus the graph object might have the object classes shown in FIG. 1. These are the subobjects that the top object (the graph object) knows how to process. The objects shown in FIG. 1 do not have values associated with them (conceptually they are classes not instances). However, the graph may still be able to supply some default value—for example, the default for the title may be the current date. When the user does define appropriate values, for example via the settings view, then the new arrangement can be displayed in different ways. Normally, the changes will only be indicated on the parts view, leaving the palette unchanged. Alternatively, however, it might be possible to modify the palette by replacing the object class with the actual instance. This would allow the user to define a half-completed template (e.g., a series of graphs all having the same scales and titles). Developing this approach further, every instance of an object could be shown in the template (e.g., every annotation associated with a graph). Indeed icons representing both the object class and the actual instance could be shown. However, the number of icons for display could in such cases become very large, and furthermore, the attraction of simply having an exhaustive list of potential object classes would be lost.

I claim:

1. An object-oriented computer system wherein the computer system is controlled by a hierarchy of objects, the hierarchy including a composite object incorporates a plurality of mutually interacting subobjects, said computer system supporting a graphical user interface, comprising:

means for maintaining within the composite object a first list of potential subobjects incorporable in the composite object:

means for displaying said first list as a set of icons each corresponding to a respective potential subobject in said first list;

means responsive to user selection of one of said set of icons for incorporating the potential subject corresponding to the selected icon within the composite object; and means for displaying a second list of subobjects as a set of icons, the subobjects in the second lists a subset of the first list and converted from potential to currently incorporated subobjects in the composite object.

2. The computer system of claim 1, wherein each of the subobjects in the first list represents an object class.

3. The computer system of claim 1 wherein the user selects a subobject to be incorporated in the composite object by, clicking a mouse on the corresponding icon in the first list and dragging and dropping the icon onto a view of the composite object.

4. A method of controlling an object-oriented computer system with a hierarchy of objects, the hierarchy including a composite object which incorporates a plurality of mutual interacting subobjects, said computer system supporting a graphical user interface, the method; comprising the steps of:

maintaining within the composite object a first list of the subobjects incorporable in the composite object;

displaying said first list as a set of icons each corresponding to a respective subobject in said list;

incorporating a subobject within the composite object in response to user selection of the icon corresponding to the selected icon; and displaying a second list of subobjects as a set of icons, the subobjects in the second list a subset of the first list and converted from potential to currently incorporated in the composite object.

5. The method of claim 4, further comprising the steps of: altering the composite object by changing the set of subobjects incorporable in the composite object; and updating the first list of subobjects accordingly.

* * * * *